United States Patent [19]
Okamoto

[11] Patent Number: 5,684,999
[45] Date of Patent: *Nov. 4, 1997

[54] APPARATUS AND A METHOD FOR RETRIEVING IMAGE OBJECTS BASED ON CORRELATION WITH NATURAL LANGUAGE SENTENCE PARAMETERS

[75] Inventor: Shusaku Okamoto, Hirakata, Japan

[73] Assignee: Matsushita Electric Industrial Co., Ltd., Kadoma, Japan

[*] Notice: The term of this patent shall not extend beyond the expiration date of Pat. No. 5,317,508.

[21] Appl. No.: 348,736

[22] Filed: Dec. 2, 1994

[30] Foreign Application Priority Data

Dec. 6, 1993 [JP] Japan ................................ 5-305103
Dec. 1, 1994 [JP] Japan ................................ 6-298453

[51] Int. Cl.$^6$ ................................................ G06F 17/28
[52] U.S. Cl. ........................ 395/759; 382/305; 395/603
[58] Field of Search ........... 364/419.13, 419.01–419.02, 364/419.07–419.08; 394/147; 382/305, 306, 175

[56] References Cited

U.S. PATENT DOCUMENTS

| | | |
|---|---|---|
| 4,695,975 | 9/1987 | Bedrij . |
| 4,887,212 | 12/1989 | Zamora et al. . |
| 4,999,790 | 3/1991 | Murayama et al. . |
| 5,197,005 | 3/1993 | Shwartz et al. . |
| 5,239,617 | 8/1993 | Gardner et al. . |
| 5,265,065 | 11/1993 | Turtle . |
| 5,297,027 | 3/1994 | Morimoto et al. . |
| 5,299,123 | 3/1994 | Wang et al. . |
| 5,303,148 | 4/1994 | Mattson et al. . |
| 5,317,508 | 5/1994 | Okamoto et al. . |

FOREIGN PATENT DOCUMENTS

| | | |
|---|---|---|
| 61-281377 | 12/1986 | Japan . |
| 251775 | 2/1990 | Japan . |
| 498463 | 3/1992 | Japan . |
| 4108175 | 6/1992 | Japan . |
| 4180175 | 6/1992 | Japan . |
| 5120399 | 5/1993 | Japan . |
| 5189531 | 7/1993 | Japan . |

OTHER PUBLICATIONS

Inoue et al, The Thesis Journal of the Institute of Electronics, Information and Communication Engineers, vol. J72-D-II, No. 11, pp. 1824–1832, Nov. 1989.

The Institute of Electronics, Information and Communication Engineers, pp. 1–23, 1988, "Basic Technique of Natural Language Processing".

Shibata et al, The Thesis Journal of the Institute of Electronics, Information and Communication Engineers, DII, vol. J73-D-II, No. 4, pp. 526 534, Apr. 1990, "Associative Retrieval Method for Image Database".

Lecture Notes in Computer Science, Akl et al, "Advances in Computing & Information," Springer–Verlag, No. 468, pp. 304–313.

Inoue et al, "Component Image Filing System for Image Synthesis," Systems & Computers in Japan, vol. 21, No. 7, 1990, N.Y.

*Primary Examiner*—Gail O. Hayes
*Assistant Examiner*—George N. Stevens
*Attorney, Agent, or Firm*—Renner, Otto, Boisselle, Sklar

[57] ABSTRACT

An apparatus for retrieving image objects in accordance with a natural language sentence according to the present invention includes: an input section for receiving a natural language sentence; a language processing section for parsing the natural language sentence by referring to a dictionary for language analysis so as to obtain a syntactic structure of the natural language sentence; a situation element division section for converting the syntactic structure of the natural language sentence into a semantic structure of the natural language sentence and for dividing a situation represented by the semantic structure of the natural language sentence into at least one situation element by referring to a situation element division knowledge base; an image database for storing at least one image object corresponding to the at least one situation element; and a retrieval section for retrieving at least one image object from the image database by using the situation element as an image retrieval key.

13 Claims, 13 Drawing Sheets

FIG.1C

| | |
|---|---|
| 103 — John is running | $X_1$ |
| 104 — Mike is riding a bicycle | $X_2$ |
| A tree grow thick | $X_3$ |
| A tree grow thick | $X_4$ |
| A tree grow thick | $X_5$ |
| 105 — Mike is coaching John riding a bicycle | $X_1, X_2$ |
| 106 — roadside trees | $X_3, X_4, X_5$ |
| 107 — ○○ Park | |

| 304 → | | | | |
|---|---|---|---|---|
| John | human(Upper Class) | ... | Image 1 | Image 2 | ... |
| Mike | human(Upper Class) | ... | Image 1 | Image 8 | ... |
| Tom | human(Upper Class) | ... | Image 2 | Image 9 | ... |
| bicycle | vehicle(Upper Class) | ... | Image 1 | Image 3 | ... |
| tree | plant(Upper Class) | ... | Image 1 | Image 5 | ... |
| ○○ Park | Park(Upper Class) | ... | Image 1 | Image 6 | ... |
| ×× Marathon | Marathon(Upper Class) | ... | Image 2 | Image 10 | ... |
| run | | | Image 1 | Image 2 | ... |
| coach | | | Image 1 | Image 14 | ... |
| runner | | | Image 2 | Image 4 | ... |
| cheer | | | Image 2 | Image 13 | ... |
| the first group | ... | .. | Image 2 | Image 12 | .. |

| | | | P1 | P2 | BG1 | BG2 |
|---|---|---|---|---|---|---|
| run | | | ○ | ○ | | |
| AGENT | ANIMATE | | ○ | | | |
| PARTICIPANT | ANIMATE | with | | ○ | | |
| LOCATIVE | LOC RACE | on at | | | ○ | |
| PURPOSE | * | in | | | | ○ |

501 — run
502 — (attribute table)
503 — (P1 P2 BG1 BG2)

FIG.6

| run | | |
|---|---|---|
| AGENT | Tom | |
| PARTICIPANT | John | with |
| LOCATIVE | ×× Marathon | on at |
| PURPOSE | first group | in |

FIG.11C

| | |
|---|---|
| John is running | $X_1$ |
| Tom is running | $X_2$ |
| Tom is running a race with John | $X_1, X_2$ |
| Many peaple by the roadside are cheering first group runners at ×× Marathon. | |

FIG.12

| run | | |
|---|---|---|
| AGENT | John | |
| PARTICIPANT | Tom | with |
| LOCATIVE | ○○ Park | at |

APPARATUS AND A METHOD FOR RETRIEVING IMAGE OBJECTS BASED ON CORRELATION WITH NATURAL LANGUAGE SENTENCE PARAMETERS

BACKGROUND OF THE INVENTION

1. Field of the Invention

The present invention relates to an apparatus and a method for retrieving image objects stored in an image database by using a natural language. In particular, the present invention relates to an apparatus and a method for easily retrieving images that are related to the content of a document, such as a pamphlet or a manual, created by using a document creation device such as a wordprocessor or a DTP (Desk Top Publishing) device.

2. Description of the Related Art

Since an image can carry a great deal of information which is concrete relative to that carried by words, images are used in many aspects of our daily life, e.g., pamphlets, magazines, TV news, etc. Therefore, there has been an increasing demand for a system that allows any person to easily retrieve a desired image from a database in which a large amount of images are stored. Conventional methods for retrieving images include the following:

(1) Methods in which keywords are used:

According to methods in this category, several keywords are previously assigned to each image stored in a database. When a user inputs several keywords related to a desired image, the similarity between the input keywords and the keywords assigned to each image is calculated by using the distances between keyword vectors, for example, so that images are presented to the user in descending order of similarity. The use of keyword vectors is disclosed in SHIBATA, INOUE, "Associative Retrieval Method for Image Database", THE THESIS JOURNAL OF THE INSTITUTE OF ELECTRONICS, INFORMATION AND COMMUNICATION ENGINEERS, D-II, Vol. J73-D-II, No. 4, pp. 526–534, 1990, for example.

(2) Methods in which similar images are traced:

According to methods in this category, several images which will serve as clues for retrieval are displayed for a user. As in the methods described in (1) above, several keywords are previously assigned to each image stored in a database. When the user selects one that seems most similar to a desired image out of the group of displayed images, the apparatus calculates images that are similar to the selected image by using the distances between keyword vectors as in (1) above, for example, and displays images similar to the selected image in descending order of similarity. The user arrives at the desired image through a repetition of this cycle.

(3) Methods in which hand-drawn sketches are used:

According to methods in this category, a user draws a sketch by hand or with the use of a drawing tool, etc. to the best of his/her memory. Then, the similarity between the sketch drawn by the user and each stored image is calculated based on the degree of coincidence of the color of each pixel, so as to present images in descending order of similarity.

Hereinafter, the features of the above methods (1) to (3) will be described.

The method of (1), in which keywords are used, has the following advantages, for example: any keyword can be used for the retrieval as long as it is previously registered in the apparatus; it is easy to newly register a keyword that has not been registered in the dictionary of the apparatus; and relatively decent retrieval can be conducted by simply correlating the keywords so as to be superior or subordinate to one another. Therefore, this method is frequently used for a document database.

However, this method may not necessary allow a user to obtain the desired retrieval results when the method is applied to the retrieval of images. Specifically, keywords alone cannot quantitatively express the meaning of a given image (e.g., the situation of the image expressed in the form of one or more sentences), so that a given keyword, which is assigned by one who registers images in a subjective manner, may not always be the best keyword for a user.

With the method of (2), which utilizes similar images, a desired image can be retrieved while a user browses through presented images, which makes it easier for the user to see the development of the retrieval, as compared with the method of (1), where keywords are used.

However, this method has problems similar to method (1). Specifically, the apparatus calculates the similarity between one image that is selected by a user and all the images stored therein by using keywords that are previously assigned to the stored images, so that the user may not necessarily be able to obtain the desired retrieval results.

Thus, both of the methods of (1) and (2) have a problem in that, while the contents of the images are expressed with the use of keywords, the correlation between the keywords and the images may vary depending on the user, so that a user may not necessarily be able to obtain the desired retrieval results.

The method of (3) above, in which hand-drawn sketches are used, is intended to solve the abovementioned problem by presenting an image to the apparatus. According to this method, a user draws a sketch of a desired image by using a drawing processor that utilizes a mouse. The sketch may include line drawings of two digits (of 1 or 0), and also color information. The sketch is immediately subjected to a data conversion process so as to calculate the similarity between the sketch and the stored images. Then, similarity is calculated by using the edge information, color information, etc. of the sketch. As a result, images which are similar to the input sketch are sequentially presented in descending order of similarity.

The above method has an advantage in that, since previously quantified information, such as contour information and color information of images, is used for the calculation of similarity, no mental work such as searching for inquiry keywords in a dictionary is required, so that the user only needs to know the content of the desired image to conduct the retrieval.

However, the above method has a problem in that the user cannot draw a sketch when he/she does not know the content of a desired image, so that he/she may not always be able to retrieve the desired image. Moreover, since contours, colors, etc. of images are used as information during the calculation of the similarity, the calculation cost of the similarity becomes large, resulting in a large amount of time required for the retrieval, especially in the case of a large scale database.

Furthermore, in any of the above methods (1) to (3), it is generally the case that, when a desired image is not present in the database, the image is obtained through an edition/synthesis process of a plurality of images. Thus, it is required to first retrieve every image that contains objects necessary for the synthesis of the desired image, and then cut out the necessary object portions and combine the cut-out object portions with a background image so as to obtain the desired image. This process requires a large amount of effort on the part of the user.

An exemplary image retrieval method in which the above methods (1) (where keywords are used) and (2) (where similar images are traced) are combined is disclosed in INOUE, SHIBATA, NAKASU, "Pictorial Parts Filing System for Image Synthesis", THE THESIS JOURNAL OF THE INSTITUTE OF ELECTRONICS, INFORMATION AND COMMUNICATION ENGINEERS, Vol. J72-D-II, NO. 11, pp. 1824–1832, November 1989. An example of the image retrieval method (3) is disclosed in Japanese Laid-Open Patent Publication No. 2-51775.

Such conventional image retrieval techniques have a problem in that, in the case where keywords are used for the inquiry, the retrieval results may not necessarily reflect what a user desires to retrieve because of being unable to express the meaning of the image in a quantitative manner; or, in the case where sketches are used for the inquiry, retrieval of the image is impossible if the user does not know what the desired image is like, even if provided with a means to accurately inform the apparatus of what the user desires to retrieve.

In addition, when the desired image is not present in the image database, the user of a conventional image retrieval apparatus is required to create the desired image through an edition/synthesis process. This edition/synthesis process must be performed by manual labor, which requires a large amount of effort on the part of the user.

SUMMARY OF THE INVENTION

An apparatus for retrieving image objects in accordance with a natural language sentence according to the present invention includes: input means for receiving a natural language sentence; language processing means for parsing the natural language sentence by referring to a dictionary for language analysis so as to obtain a syntactic structure of the natural language sentence; situation element division means for converting the syntactic structure of the natural language sentence into a semantic structure of the natural language sentence and for dividing a situation represented by the semantic structure of the natural language sentence into at least one situation element by referring to a situation element division knowledge base; an image database for storing at least one image object corresponding to the at least one situation element; and retrieval means for retrieving at least one image object from the image database by using the situation element as an image retrieval key.

In one embodiment of the invention, each of the image objects includes image attribute data relating to at least one region included in an image, and the retrieval means subjects the image objects obtained from the image database in accordance with the image attribute data to a further screening.

In another embodiment of the invention, the image attribute data includes region data defining at least one region included in the image and information representing the meaning of the at least one region.

In still another embodiment of the invention, the information is represented by the natural language sentence.

In still another embodiment of the invention, the retrieval means includes means for calculating a similarity between each of the image retrieval key and each of the image attribute data, and means for providing region availability information defining whether the image attribute data is available or not available in accordance with the similarity.

In still another embodiment of the invention, the apparatus further includes display means for displaying at least a portion of the image object retrieved by the retrieval means in accordance with the region availability information.

In still another embodiment of the invention, the situation element division knowledge base includes a plurality of case frames for defining a meaning of the natural language sentence, and wherein each of the plurality of the case frames includes: a word defining a predicate in the natural language sentence; a slot describing a pair consisting of a name of a case element related to the word and a constraint for the case element to satisfy; and situation element data describing knowledge for dividing the situation into the at least one situation element.

In still another embodiment of the invention, the situation element division means classifies the at least one situation element into a group related to a background and a group related to a foreground based on the situation element division data of the case frames.

In still another embodiment of the invention, the dictionary for language analysis includes a rule for deleting words that are unnecessary for retrieving images from the natural language sentence, and the language processing means includes image retrieval preprocessing means for deleting words from the natural language sentence in accordance with the rule.

Alternatively, an apparatus for retrieving image objects in accordance with a natural language sentence according to the present invention includes: an image database for storing a plurality of image objects, each of the plurality of image objects including image attribute data representing a meaning of a region included in an image and pixel data corresponding to the region; input means for receiving a natural language sentence; parsing means for parsing the natural language sentence so as to obtain an analysis frame representing a meaning of the natural language sentence, the analysis frame including at least one element; correlating means for correlating the at least one element of the analysis frame with one another so as to define an image retrieval key representing a partial meaning of the natural language sentence; and retrieval means for retrieving at least one image object from the image database based on a semantic similarity between the image retrieval key and the image attribute data.

In one embodiment of the invention, the analysis frame includes a predicate, a case element related to the predicate, and a value of the case element.

In another embodiment of the invention, the correlating means defines either an image retrieval key related to a background or an image retrieval key related to a foreground in accordance with the partial meaning of the natural language sentence.

In another aspect of the present invention, a method for retrieving image objects from an image data-base in accordance with a natural language sentence is provided, the image database storing a plurality of image objects, each of the plurality of image objects including image attribute data representing a meaning of a region included in an image and pixel data corresponding to the region, wherein the method includes the steps of: a) receiving a natural language sentence; b) parsing the natural language sentence so as to obtain an analysis frame representing a meaning of the natural language sentence, the analysis frame including at least one element; c) correlating the at least one element of the analysis frame with one another so as to define an image retrieval key representing a partial meaning of the natural language sentence; and d) retrieving at least one image object from the image database based on a semantic similarity between the image retrieval key and the image attribute data.

In one embodiment of the invention, the analysis frame includes a predicate, a case element related to the predicate, and a value of the case element.

In another embodiment of the invention, the step c) includes a step for defining either an image retrieval key related to a background or an image retrieval key related to a foreground in accordance with the partial meaning of the natural language sentence.

According to the present invention, when registering image objects in an image database, region data indicating regions defining constituent elements of the images is created, and parts of regions and image content information are stated as image attribute data of image objects.

In accordance with the image retrieval apparatus of the present invention, a natural language sentence representing the content of a desired image is input via an input section. A language processing section parses, i.e., analyzes the syntactic structure of, the input natural language sentence. A situation element division section converts the syntactic structure of the natural language sentence into a semantic structure. In other words, a situation represented by the input natural language sentence is divided into partial situation elements constituting the situation, and image retrieval keys corresponding to the respective divided situation elements are generated. Herein, a situation element is defined as the minimum sentence unit that describes a situation.

In an image retrieval section, image objects related to every one of the divided situation elements are retrieved. The retrieved image objects may be subjected to a further screening where image object candidates are further narrowed down.

When the semantic structure of the input natural language sentence and the semantic structure of the retrieval image object completely coincide with each other, it means that the desired image object has been found. Accordingly, a display section displays the retrieved image object. When the semantic structure of the input natural language sentence and the semantic structure of the retrieval image object do not completely coincide with each other, the display section displays image objects corresponding to a foreground and image objects corresponding to a background, both of which are necessary for expressing the semantic structure of the input natural language sentences in a separate manner. Moreover, if necessary, it is possible to edit the displayed image objects.

Thus, the invention described herein makes possible the advantage of providing an image retrieval apparatus which makes it possible to accurately inform the apparatus of what a user desires to retrieve even if the user does not know what the desired image is like, and ensures that the retrieval results will reflect what the user desires to retrieve even when the desired image is not present in the image database, and that the desired image can be easily arrived at through edition/synthesis.

This and other advantages of the present invention will become apparent to those skilled in the art upon reading and understanding the following detailed description with reference to the accompanying figures.

BRIEF DESCRIPTION OF THE DRAWINGS

FIG. 1C is a diagram showing the structure of image attribute data corresponding to the image shown in FIG. 1A.

FIG. 3 is a diagram showing the structure of an image object retrieval dictionary.

FIG. 5 is a diagram showing the structure of a case frame included in a situation element division knowledge base.

FIG. 6 is a diagram showing the structure of a case frame representing a semantic structure of a natural language sentence.

FIG. 11C is a diagram showing the structure of image attribute data corresponding to the image shown in FIG. 11A.

FIG. 12 is a diagram showing the structure of a case frame representing a semantic structure of a natural language sentence.

DESCRIPTION OF THE PREFERRED EMBODIMENTS

Hereinafter, the present invention will be described with reference to the accompanying figures.

Figure 1A:
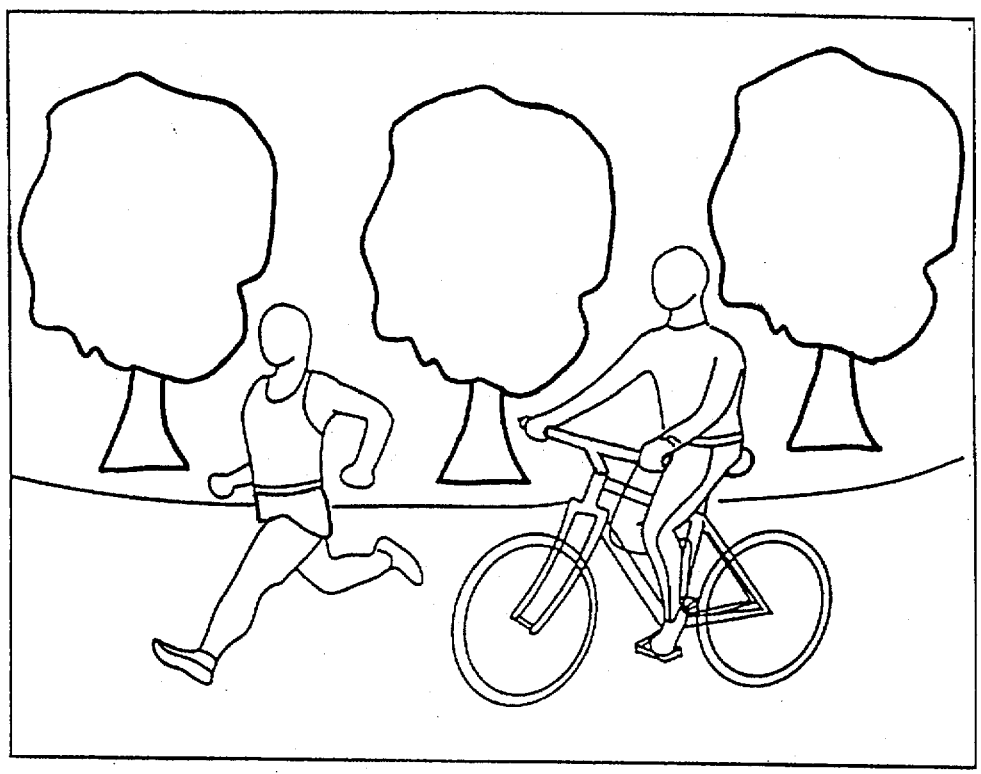
FIG. 1A is a diagram showing an example of an image to be stored in an image database.

FIG. 1A Shows an exemplary image to be stored in an image database. This image represents a scene where "Mike is coaching John riding a bicycle in ○○ Park, where there are trees growing". As shown by this example, an image represents a specific meaning. Moreover, individual regions that are included in an image can be interpreted as representing meanings that may be different from the meaning of the entire image. For example, if a scene where "Mike is coaching John riding a bicycle" is interpreted with respect to the individual regions included in the image, an interpretation that "Mike is riding a bicycle" and an interpretation that "John is running" can be obtained. Furthermore, if a scene of "roadside trees" is interpreted with respect to the individual regions included in the image, an interpretation can be obtained that there are three "trees".

The present invention provides an apparatus for conducting a retrieval of an image from an image database based on the meaning of the whole or part of such an image. An image which is stored in an image database can be used for the synthesis of other images. In this respect, each image stored in an image database is referred to as an "image object" in the present specification. As used herein, an image object includes pixel data, region data, and image attribute data. The pixel data consists of a set of pixel values. For example, in the case of an image object of 640×480 dots, the pixel data consists of a set of 640×480 pixel values. The region data is data for specifying the position of at least one region included in a given image object. For example, the region data may be a set of coordinates defining the contour of a region. The pixel data and the region data can be stored in the image database by a known method. The image attribute data defines the relationship between the meanings of the pixel data and the respective regions. The meaning(s) represented by the pixel data may correspond to one region or a plurality of regions.

Figure 1B:
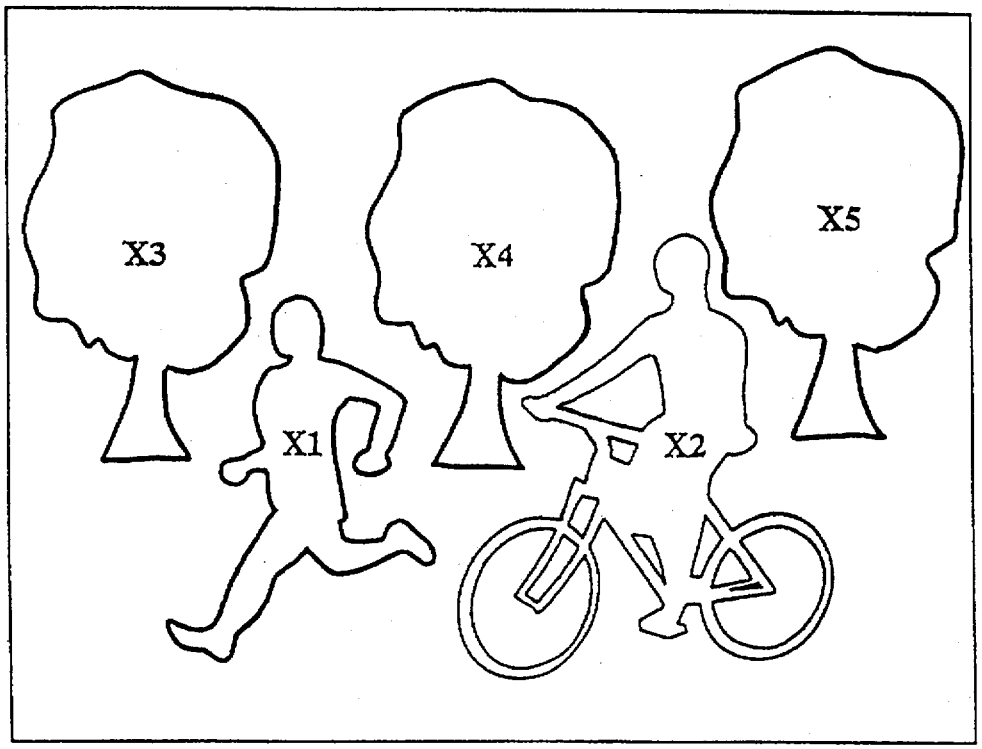
FIG. 1B is a diagram showing examples of regions included in the image shown in FIG. 1A.

FIG. 1B shows exemplary regions included in the image of FIG. 1A. As shown in FIG. 1B, the image of FIG. 1A includes regions $X_1$ to $X_5$. As mentioned above, the region data specifies the positions of regions $X_1$ to $X_5$.

FIG. 1C shows the structure of image attribute data corresponding to the image of FIG. 1A. The image attribute data includes information 101, which represents the meaning of the whole or part of the pixel data, and a region section 102 related to the whole or part of the pixel data. The information 101 may, for example, be described by a natural language sentence. The natural language sentence may be replaced by a sentence in any other language that permits retrieval or searching. For example, the meaning of the whole or part of the pixel data may be expressed in the form of a sequence of words of a natural language.

In FIG. 1C, image attribute data 103 defines that the meaning of the pixel data that corresponds to region $X_1$ is that "John is running". Image attribute data 104 defines that the meaning of the pixel data that corresponds to region $X_2$ is that "Mike is riding a bicycle". The image attribute data 103 and 104 each illustrate an example where the meaning of one set of pixel data corresponds to one region. However, the meaning of one set of pixel data may correspond to two or more regions. For example, image attribute data 105 defines that the meaning of the pixel data that corresponds to a region consisting of regions $X_1$ and $X_2$ is that "Mike is coaching John riding a bicycle". Image attribute data 106 defines that the meaning of the pixel data that corresponds to a region consisting of regions $X_3$ to $X_5$ is "roadside trees". Thus, the image attribute data is defined in such a way that the meaning of pixel data corresponding to a combination of a plurality of regions is different from the meaning of any pixel data corresponding to one region.

In the pixel attribute data 107, no corresponding region is defined for the meaning of the pixel data. In other words, the pixel attribute data 107 adopts an expression in which the corresponding region for the meaning of the pixel data is omitted. Such an omission indicates that the meaning of the pixel data is related to the entire image shown in FIG. 1A, including regions $X_1$ to $X_5$ shown in FIG. 1B (i.e., the background region of the image). Accordingly, the image attribute data 107 defines that the meaning of the pixel data corresponding to the background region is "○○ Park". Thus, it will be seen that, in the case where a region is defined to correspond to the meaning of given pixel data in pixel attribute data, the pixel data relates to the foreground region of the image, and that, in the case where no region is defined to correspond to the meaning of given pixel data in pixel attribute data, the pixel data relates to the background region of the image. Accordingly, it is possible to determine whether the meaning of given pixel data in pixel attribute data relates to the foreground region or the background region of an image by checking whether or not any regions are defined to correspond to the pixel data.

Figure 2:
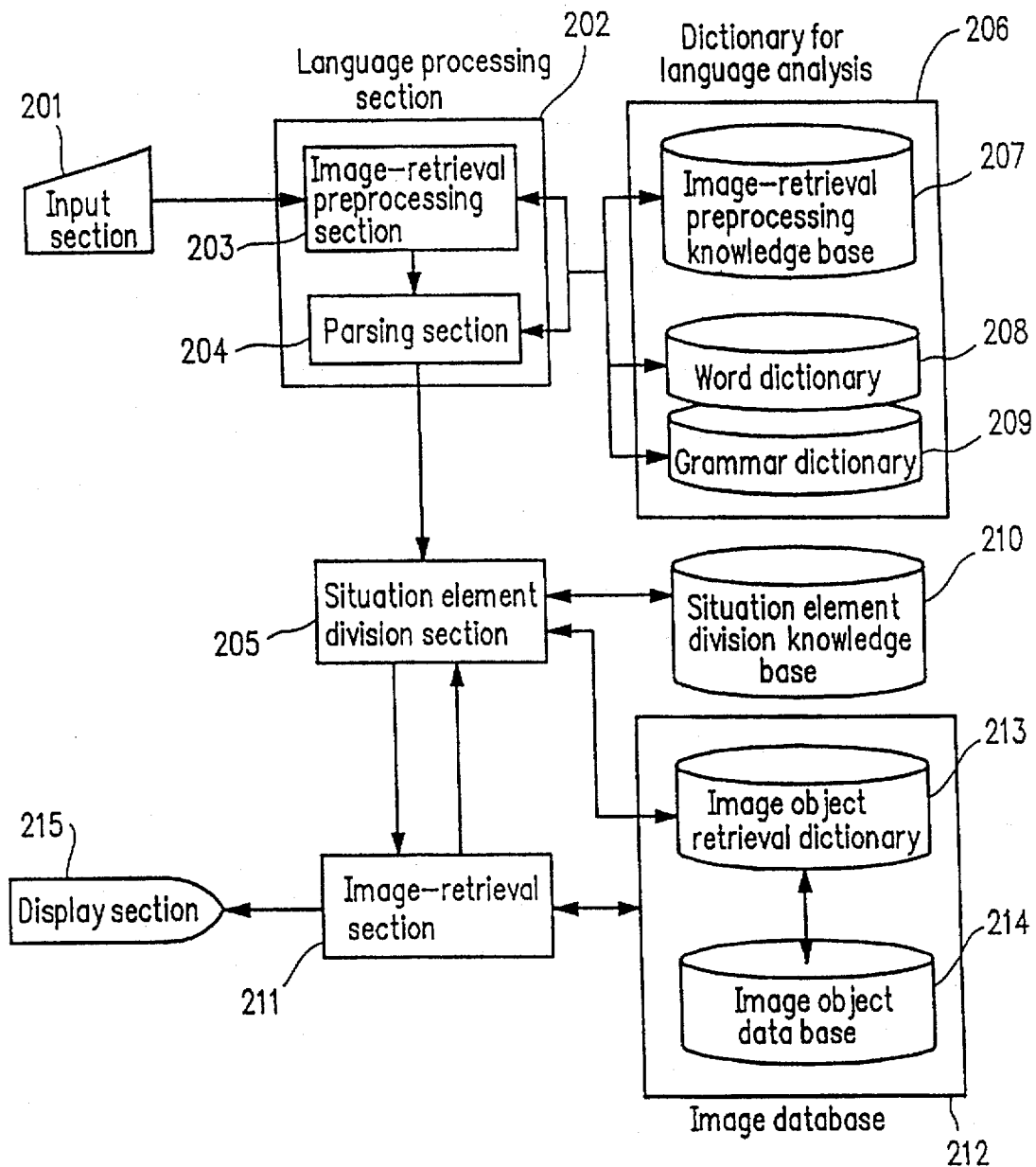
FIG. 2 is a block diagram showing a configuration for an image retrieval apparatus according to an example of the present invention.

FIG. 2 shows a configuration for an image retrieval apparatus according to an example of the present invention. As shown in FIG. 2, the image retrieval apparatus includes: an input section 201 for inputting natural language sentences; a language processing section 202 for analyzing the syntactic structure of a natural language sentence by referring to a dictionary 206 for language analysis; a situation element division section 205 for converting the syntactic structure of the natural language sentence into a semantic structure by referring to a situation element division knowledge base 210, and for dividing a situation represented by the semantic structure of the natural language sentence into at least one situation element so as to generate an image retrieval key corresponding to the situation element; an image retrieval section 211 for retrieving image objects from an image database 212 based on the image retrieval key; and a display section 215 for displaying the retrieved image objects and for, if necessary, editing the image objects.

The image database 212 includes an image object retrieval dictionary 213 for retrieving image objects and an image object database 214 for storing image objects.

FIG. 3 shows a structure of the image object retrieval dictionary 213. The image object retrieval dictionary 213 includes a plurality of image object retrieval data. Each image object retrieval data in FIG. 3 corresponds to one line of the image object retrieval dictionary 213. Each image object retrieval data includes a keyword 301 indicating the content of an image object, a pointer 302 to other image object retrieval data that are related to the image object retrieval data itself, and a pointer 303 to image objects that are related to the keyword 301. As shown in FIG. 3, the keyword 301, the pointer 302, and the pointer 303 are partitioned by double vertical lines.

As an example of image object retrieval data, image object retrieval data 304 shown in the first row of FIG. 3 will be described below. The image object retrieval data 304 has "John" as the keyword 301, at least "human (Upper Class)" as the pointer 302, and at least "Image 1" and "Image 2" as the pointer 303. The value "human (Upper Class)" indicates that any image object retrieval data having "human" as the keyword 301 is correlated as "Upper Class" to the image object retrieval data 304. The values "Image 1" and "Image 2" represent pointers to the image objects related to "John" by sequential numbers assigned to such image objects. Specifically, the values "Image 1" and "Image 2" indicate that image 1 and image 2 are stored in the image object database 214 as image objects related to "John".

With reference to FIG. 2, the language processing section 202 analyzes the syntactic structure of an input natural language sentence by referring to the dictionary 206 for language analysis. The dictionary 206 for language analysis includes an image-retrieval preprocessing knowledge base 207, a word dictionary 208 and a grammar dictionary 209. The language processing section 202 includes: an image-retrieval preprocessing section 203 for, if necessary, deleting unnecessary words and/or correcting words among those included in the input natural language sentence by referring to the image-retrieval preprocessing knowledge base 207; and a parsing section 204 for analyzing the syntactic structure of the natural language sentence as processed by the image-retrieval preprocessing section 203 by referring to the word dictionary 208 and the grammar dictionary 209. The method for parsing by the parsing section 204 is a technique known in the field of natural language processing. For example, a method for implementing the parsing section 204, the word dictionary 208, and the grammar dictionary 209 is disclosed in "Basic Technique of Natural Language Processing", pp. 1 to 23, THE INSTITUTE OF ELECTRONICS, INFORMATION AND COMMUNICATION ENGINEERS, 1988. The parsing section 204 of the image retrieval apparatus according to the present invention may be embodied by using any parsing method as long as the parsing results of the input natural language sentences are properly output from the parsing section 204.

Hereinafter, the process performed at the language processing section 202 will be briefly described with respect to a case where The following natural language sentence (1) is input to the image retrieval apparatus by the input section 201:

"Tom is running with John in the first group at XX Marathon.": (1)

The image-retrieval preprocessing section 203 deletes unnecessary words and/or corrects any words, from the input natural language sentence (1), that are unnecessary for expressing an image. For example, the image-retrieval preprocessing section 203 performs image-retrieval preprocessing such as deletion of prefixes, words expressing mood information and/or honorific expressions, and conversion of any conjugated/declined words into the base forms thereof. The image-retrieval preprocessing is performed by referring to image-retrieval preprocessing knowledge stored in the image-retrieval preprocessing knowledge base 207.

The image-retrieval preprocessing knowledge includes a rule that "If a BE verb or a conjugate of the BE verb is followed by a present participle of a verb, then the BE verb or the conjugate of the BE verb is removed, and the present participle of the verb is converted into the base of the verb", for example. The above rule defines that, if the input natural language sentence includes mood information, such as the progressive form, any portion expressing the progressive form should be removed and converted into the base form. For example, in the natural language sentence (1), the second word "is" (BE verb) is followed by the third word "running" (present participle of the verb "run"), so that the above rule is applied. As a result, the second word "is" is removed, and the third word "running" is converted into "run" (base form). In other words, the natural language sentence (1) is converted into the following natural language sentence (1'):

"Tom run with John in the first group at XX Marathon.": (1')

By performing the above process with the image-retrieval preprocessing section 203, it becomes unnecessary to include grammar rules of conjugations, grammar rules encompassing prefixes, and the like in the grammar dictionary 209. Thus, the number of grammar rules to be included in the grammar dictionary 209 can be reduced. As a result, the processing speed of the parsing section 204 can be increased. However, the image retrieval preprocessing section 203 may be omitted. The reason is that, in some cases, it may make for a more accurate retrieval to take into account conjugation and the like.

The image-retrieval preprocessing knowledge is incorporated in the image retrieval apparatus by using a programming language. For example, if the programing language is a procedural language, the image-retrieval preprocessing knowledge can be easily expressed by using if-then type condition branches. The above-mentioned rule may be expressed as follows by using a procedural language:

```
if (a BE verb or a conjugate of the BE verb is
followed by a present participle of a verb)
    then {remove the BE verbh or the conjugate of the
        BE verb.
        convert the present participle of the verb
        into the base form of the verb.
    }
```

A plurality of image-retrieval preprocessing knowledge pieces can be expressed as follows by using a plurality of if-then type condition branches. Such if-then type condition branches are sequentially processed by the image-retrieval preprocessing section 203.

```
if (condition for performing an image-retrieval
        preprocess)
    then {
        perform the image-retrieval preprocess.
    }
        .
        .
        .
if (condition for performing an image-retrieval
        preprocess)
    then {
        perform the image-retrieval preprocess.
    }
```

The parsing section 204 parses a natural language sentence by referring to the grammar dictionary 209. The grammar dictionary 209 includes the following rules ER1 to ER10 of English grammar, for example:

ER1) S→NP VP
ER2) VP→VP PP
ER3) VP→V NP
ER4) VP→V
ER5) NP→NP PP
ER6) NP→D NP
ER7) NP→A NP
ER8) NP→N NP
ER9) NP→N
ER10) PP→P NP

The symbols used in the above rules ER1) to ER10) represent the following items:

S: sentence
NP: noun phrase
N: noun
VP: verb phrase
V: verb
PP: preposition phrase
P: preposition
A: adjective
D: articles (denominator)

Each rule defines that "a symbol on the left of → is a sequence of symbols on the right of → in that order". For example, rule ER5) defines that "a noun phrase is a sequence of a noun phrase and a preposition in this order".

Figure 4:
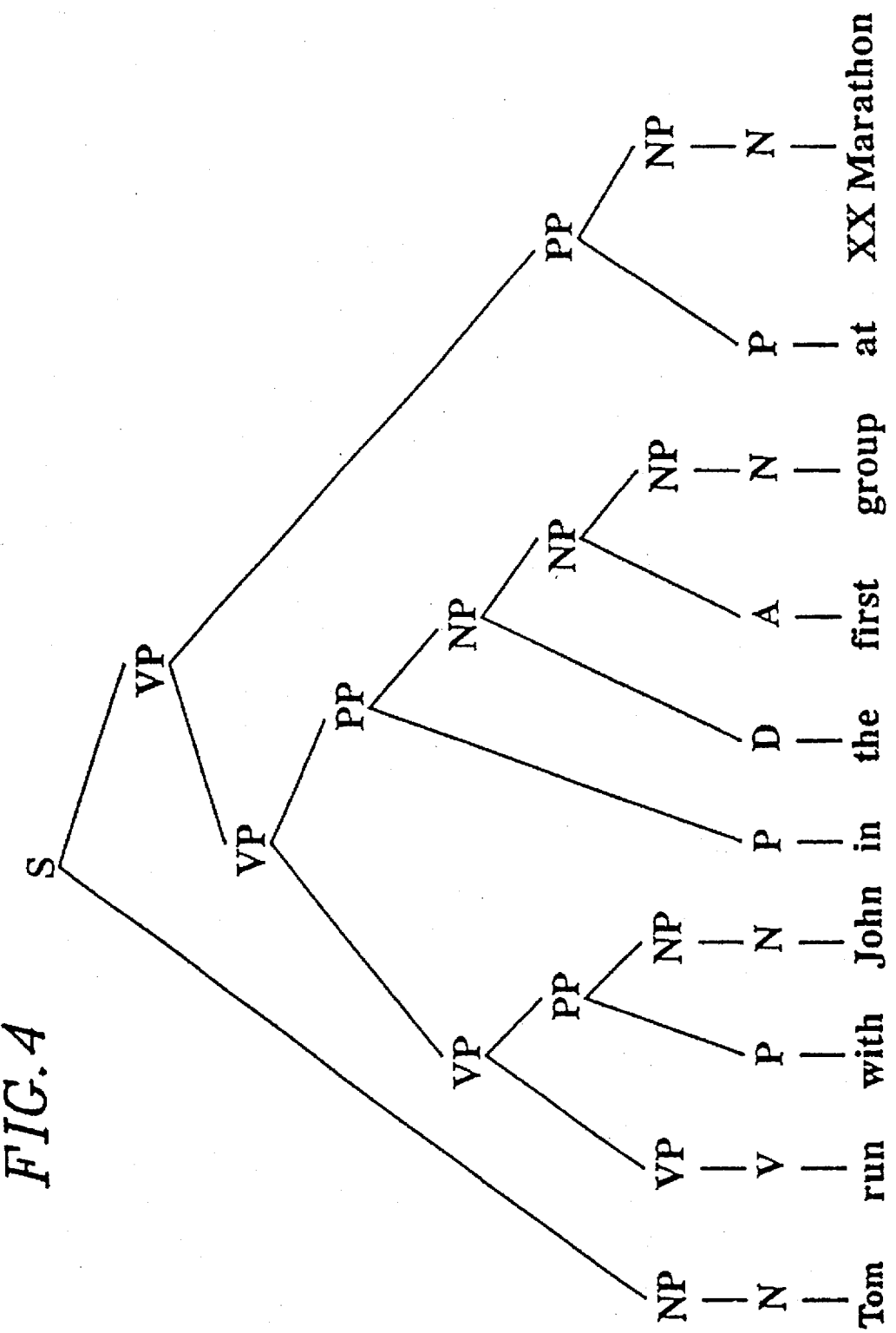
FIG. 4 is a diagram showing an exemplary analysis result of a syntactic structure expressed in a tree structure.

FIG. 4 shows a parsing result of the natural language sentence (1') by the parsing section 204 in the form of a syntax tree. The syntax tree has a structure in which a plurality of nodes are combined in a hierarchial manner. One of rules ER1) to ER10) is applied in order to generate one node. For example, rule ER1) is applied to the uppermost node S in FIG. 4. This is because the node S coincides with the symbol "S" on the left of "→" in rule ER1), and the sequence of subordinate nodes of the node S coincides with the sequence of symbols on the right of "→" in rule ER1). As a result, nodes NP and VP are generated as subordinate nodes of the node S.

The situation element division section 205 converts the syntactic structure of a natural language sentence into a semantic structure by referring to the situation element division knowledge base 210, and divides a situation represented by the semantic structure of the natural language sentence into at least one situation element, so as to generate at least one image retrieval key corresponding to the at least one situation element. The situation element division knowledge base 210 includes a plurality of case frames. The case frames are used for defining the semantic structure of a given natural language sentence.

FIG. 5 shows the structure of one case frame included in the situation element division knowledge base 210. This case frame concerns a predicate "run". As shown in FIG. 5, the case frame includes a prospective word 501 to become a predicate for a natural language sentence, a slot 502 describing a pair consisting of the name of a case element related to the word and a constraint(s) which the case element must satisfy, and situation division data 503 describing knowledge for dividing a situation represented by the semantic structure of the natural language sentence into at least one situation element. Examples of predicates of natural language sentences include predicate verbs and predicate adjectives.

The case frame of the predicate "run" includes slots corresponding to at least four following case elements: an agent case (AGENT) indicating an actor of an act, a participant case (PARTICIPANT) indicating where the act is directed, a locative case (LOCATIVE) indicating a location where the act is performed, and a purpose case (PURPOSE) indicating a purpose of the act. This indicates that any natural language sentence including "run" as a predicate may include noun phrases or preposition phrases indicating an agent, a participant, a purpose, and a location of the act "run". The constraints for these four slots to satisfy are as follows:

The agent case (AGENT) must be a noun phrase representing an animal (ANIMATE).

The participant case (PARTICIPANT) must be a preposition phrase consisting of the preposition "with" and a noun phrase representing an animal (ANIMATE).

The locative case (LOCATIVE) must be a preposition phrase consisting of the preposition "on" or "at" and a noun phrase representing a location (LOC) or a race (RACE).

The purpose case (PURPOSE) must be a preposition phrase consisting of the preposition "in" and any noun phrase. (In the case frame shown in FIG. 5, * indicates that any noun phrase can be used.)

The process for converting the syntactic structure of the natural language sentence shown in FIG. 4 into a semantic structure will be described by using the case frame shown in FIG. 5. This process is performed by the situation element division section 205.

First, preposition phrases are extracted from the natural language sentence in accordance with the parsing results. A preposition phrase consists of a preposition and a noun phrase. Then, noun phrases are extracted from the remainder of the natural language sentence after the preposition phrases are extracted. For example, three preposition phrases "with+John", "at+XX Marathon", "in+the first group" are extracted from the natural language sentence having the syntactic structure shown in FIG. 4, after which a noun phrase "Tom" is extracted. The symbol "+" represents a partition between a preposition and a noun phrase in a preposition phrase.

Next, it is determined which slot of the case frame has its constraint(s) satisfied by the preposition phrases and noun phrases thus extracted. For example, the determination as to whether or not the noun phrase "Tom" satisfies the constraint "the agent case must be an animal (ANIMATE)" of the case frame (FIG. 5) having "run" as a predicate is conducted as follows:

First, it is determined whether "Tom" coincides with "animal" by referring to the image object retrieval dictionary 213. Since "Tom" does not coincide with "animal" on the character string level, it is determined whether "animal" is of an "Upper Class" relation with respect to "Tom" in the following manner:

By conducting a retrieval from the image object retrieval dictionary 213 with "Tom" as a keyword, image object retrieval data concerning "Tom" can be obtained. By tracing pointers to other image object retrieval data of an "Upper Class" relation with respect to "Tom", image object retrieval data which are of an "Upper Class" relation with respect to "Tom" are obtained. If any of the image retrieval data thus obtained is related to "animal", then "Tom" is a member of "animal", so that the above-mentioned constraint for the agent is satisfied. Moreover, even in cases where no image object retrieval data concerning "animal" is found by only once tracing the pointers to other image object retrieval data, if image object retrieval data concerning "animal" is found by repeatedly tracing the pointers, then "Tom" is a member of "animal", so that the above-mentioned constraint is satisfied. Furthermore, in cases where a given set of image object retrieval data includes two or more pointers to other image object retrieval data which are of an "Upper Class" relation with respect to that image object retrieval data, and if no image object retrieval data concerning "animal" is found by repeatedly tracing one of the pointers, then the process may go back to the first image object retrieval data and start repeatedly tracing the other pointer. The case element "Tom" is determined not to belong to "animal" (i.e., not to satisfy the above-mentioned constraint) only if no image object retrieval data concerning "animal" is found by examining every image retrieval data traceable from the image object retrieval data concerning "Tom" in the above-mentioned manner. For example, consider the case where "human" is of an "Upper Class" relation with respect to "Tom" and "animal" is of an "Upper Class" relation with respect to "human" (although not shown in FIG. 3). In this case, "animal" is reached by tracing "Upper Class" relations twice from "Tom", so that the above-mentioned constraint "the agent case must be a noun phrase representing an animal" for the agent is satisfied.

Next, the other constraints for the agent case are examined, which reveals that "Tom" satisfies the constraint "the agent case must be a noun phrase". Therefore, the noun phrase "Tom" satisfies the constraints for the slot corresponding to the agent case of the predicate "run", so that it is confirmed that the noun phrase "Tom" is an agent of the predicate "run". Similarly, it is examined which slot has its constraint(s) satisfied by each of the preposition phrases "with+John", "at+XX Marathon", and "in+the first group". As a result of the examination, "with+John", "at+XX Marathon", and "in+the first group" satisfy the constraints for the slots corresponding to the participant case, the locative case, and the purpose case, respectively. Thus, the cases of the respective preposition phrases are confirmed.

In the above-mentioned manner, the case frame structure representing the semantic structure of the natural language sentence (1') is confirmed as shown in FIG. 6.

Referring back to FIG. 5, the situation division data 503 describes knowledge for dividing a situation represented by the case frame structure into at least one situation element. Herein, a situation element refers to a minimum sentence unit that describes a situation. Labels P1, P2, BG1, and BG2 of the situation division data 503 indicate that a situation expressed by the case frame having "run" as a predicate can be divided into two kinds of situation elements corresponding to the foreground and two kinds of situation elements corresponding to the background. Labels P1 and P2 correspond to the foreground, while labels BG1 and BG2 correspond to the background. Each circle shown below labels P1, P2, BG1, and BG2 of the situation division data 503 defines the correlation between the predicate and at least one case element related to the predicate.

For example, the two circles shown below label P1 indicate that a combination of the predicate "run" and the case element "AGENT" defines a situation element corresponding to the foreground. This is based on the knowledge that a scene in which the case element "AGENT" is performing the act "run" is regarded as a situation element. The two circles shown below label P2 indicate that a combination of the predicate "run" and the case element "PARTICIPANT" defines a situation element corresponding to the foreground. This is based on the knowledge that a scene in which the case element "PARTICIPANT" is performing the act "run" is regarded as a situation element. The circle shown below label BG1 indicates that the case element "LOCATIVE" defines a situation element corresponding to the background. This is based on the knowledge that a scene representing a location is regarded as a situation element. The circle shown below label BG2 indicates that the case element "PURPOSE" defines a situation element corresponding to the background. This is based on the knowledge that a scene representing a purpose is regarded as a situation element.

Thus, according to the situation element division data 503, a predicate and at least one case element related to the predicate are correlated with each other within one case frame. A single case element, or a combination of case elements, defines a situation element. Moreover, situation elements are classified into situation elements corresponding to the foreground and situation elements corresponding to the background by labels P1, P2, BG1, and BG2.

Next, the process for dividing a situation represented by the semantic structure of a natural language sentence into at least one situation element by referring to the situation division data 503 so as to generate image retrieval keys corresponding to the situation elements will be described. This process is performed by the situation element division section 205. As described above, the semantic structure of a natural language sentence is expressed by a case frame. Hereinafter, this process will be described with respect to, as an example, the case frame shown in FIG. 6, which expresses the semantic structure of the natural language sentence (1'). For conciseness, the case frame shown in FIG. 5 is referred to as the "dictionary frame", while the case frame shown in FIG. 6 is referred to as the "analysis frame". The dictionary frame is stored in the situation element division knowledge base 210.

As described above, in the analysis frame, the value of the case element "AGENT" is confirmed to be "Tom"; the value of the case element "PARTICIPANT" is confirmed to be "John"; the value of the case element "LOCATIVE" is confirmed to be "XX Marathon"; and the value of the case element "PURPOSE" is confirmed to be "the first group". Thus, an analysis frame includes a predicate, case elements related to the predicate, and the confirmed values of the case elements. The above-mentioned analysis frame expresses the meaning of the natural language sentence ('1). In order to define situation elements corresponding to the analysis frame, the predicate "run" and the case elements related to the predicate "run" must be correlated with one another by referring to the situation division data 503 of the dictionary frame shown in FIG. 6. For example, in connection with label P1 of the situation division data 503, a value "Tom run", which is a combination of "run" and "Tom", is defined as a situation element corresponding to the foreground. In connection with label P2 of the situation division data 503, a value "John run", which is a combination of "run" and "John", is defined as a situation element corresponding to the foreground. Similarly, in connection with label BG1 of the situation division data 503, a value "XX Marathon" is defined as a situation element corresponding to the background. In connection with label BG2 of the situation division data 503, a value "the first group" is defined as a situation element corresponding to the background.

Thus, the situation represented by the analysis frame shown in FIG. 6 is divided into four situation elements. Each situation element has a semantic structure different from the structure of the dictionary frame or the analysis frame. The semantic structure of a situation element is expressed in the following format:

((case element (value of case element), . . . , case element (value of case element)), "foreground" or "background"); or ((predicate, case element (value of case element), . . . , case element (value of case element)), "foreground" or "background")

In the present specification, a situation element expressed in the above format is referred to as "image retrieval key". An image retrieval key represents a partial meaning of an input natural language sentence. Image retrieval keys are used for retrieving image objects from the image database 212, as described later. For example, the following image retrieval keys (2-1) to (2-4) are obtained from the analysis frame shown in FIG. 6. Hereinafter, with reference to an image retrieval key, any data of the form "case element (value of case element)" will be referred to as "case element data".

((run, AGENT (Tom)), "foreground"):(2-1)

((run, PARTICIPANT (John)), "foreground"):(2-2)

(RACE (XX Marathon), "background"):(2-3)

(* (the first group), "background"):(2-4)

The image retrieval section 211 retrieves image objects related to an image retrieval key from the image database 212.

Figure 7:
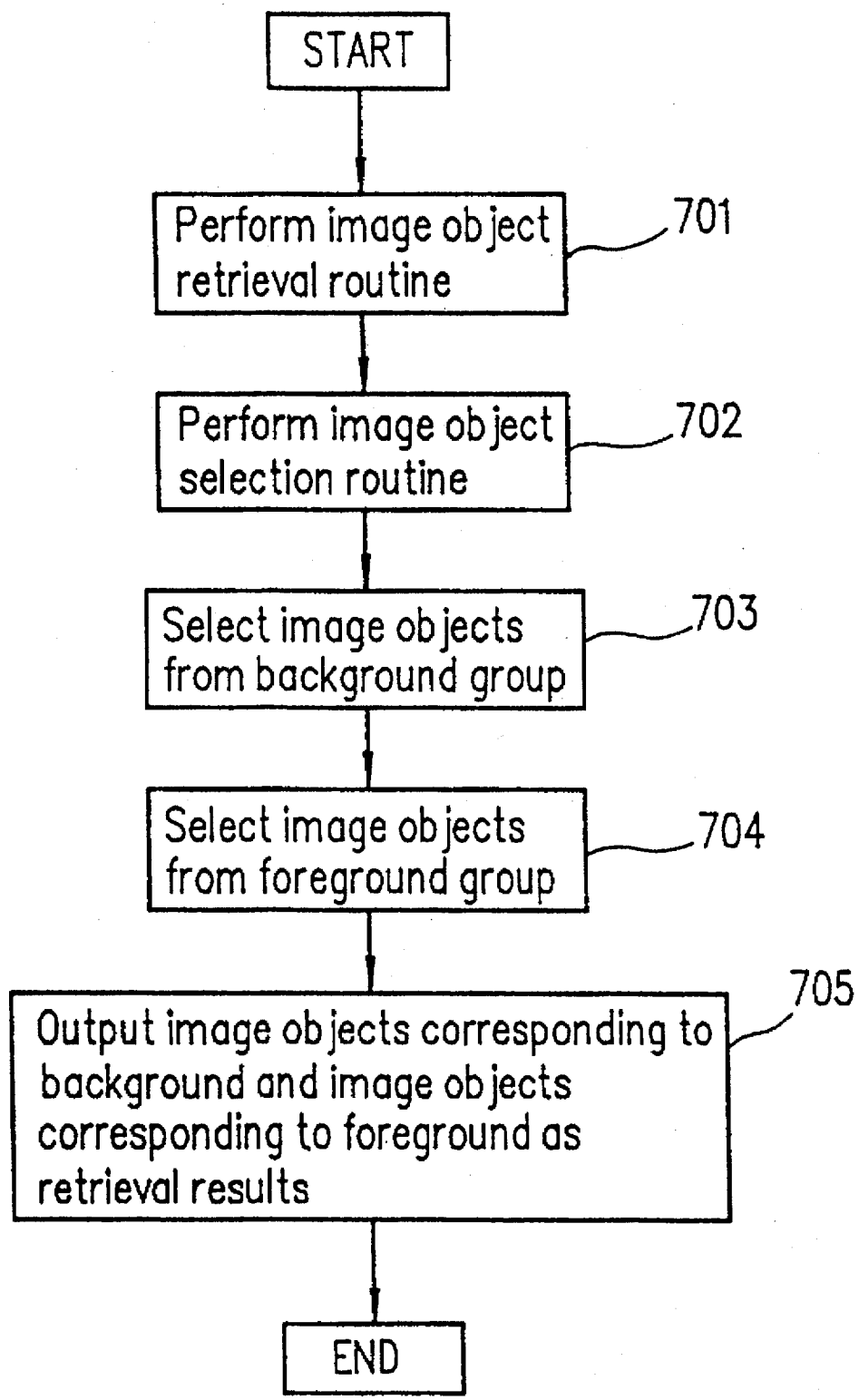
FIG. 7 is a flowchart showing the procedure of an image retrieval process according to the present invention.

FIG. 7 shows a process for retrieving image objects related to an image retrieval key from the image database 212. This retrieval process is performed by the image retrieval section 211. Hereinafter, the retrieval process will be described with respect to each step, with reference to FIG. 7.

Step 701: image retrieval keys generated by the situation element division section 205 are input to the image retrieval section 211. An IMAGE OBJECT RETRIEVAL ROUTINE (to be described later) is performed for each of the input image retrieval keys.

Step 702: Pairs of each image retrieval key and one or more image objects obtained through the IMAGE OBJECT RETRIEVAL ROUTINE are input to an IMAGE OBJECT SELECTION ROUTINE (to be described later). The IMAGE OBJECT SELECTION ROUTINE is performed for each of the input pairs.

Step 703: Among the image objects classified into a background group, those which are included in most pairs are selected.

Step 704: Among the image objects classified into a foreground group, those which are included in most pairs are selected.

Step 705: The image objects selected in step 703 are output as image objects corresponding to the background. The image objects selected in step 704 are output as image objects corresponding to the foreground.

[IMAGE OBJECT RETRIEVAL ROUTINE]

Figure 8:
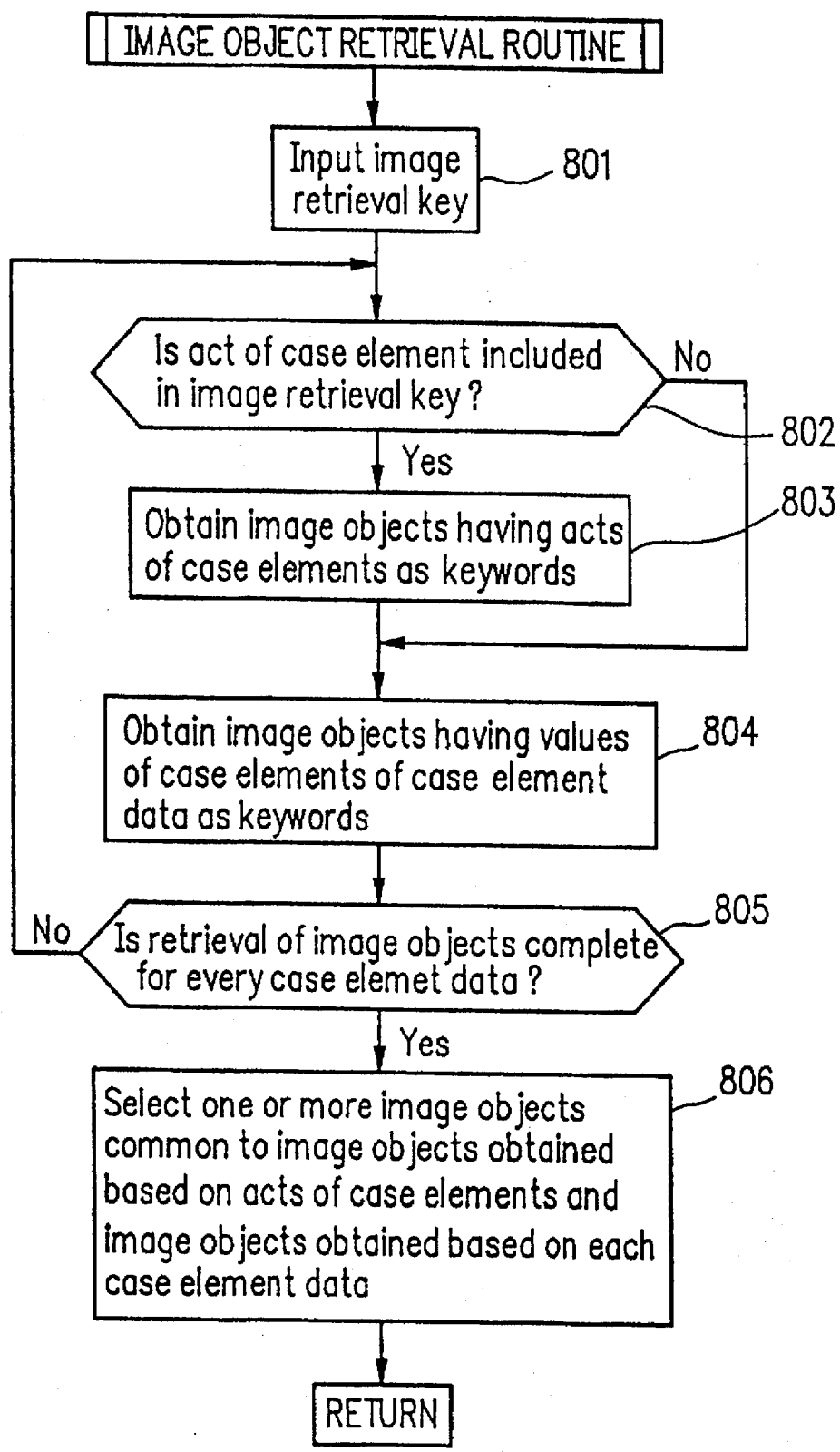
FIG. 8 is a flowchart showing the procedure of an IMAGE OBJECT RETRIEVAL ROUTINE in the image retrieval process according to the present invention.

FIG. 8 shows a process performed in the IMAGE OBJECT RETRIEVAL ROUTINE. The IMAGE OBJECT RETRIEVAL ROUTINE is a routine for receiving an image retrieval key and obtaining one or more image objects related to the image retrieval key from the image database 212. Hereinafter, this process will be described with respect to each step, with reference to FIG. 8.

Step 801: An image retrieval key is input to the IMAGE OBJECT RETRIEVAL ROUTINE.

Step 802: It is determined whether or not a predicate describing an act of a case element is included in the input image retrieval key.

Step 803: If a predicate is included in the input image retrieval key, image object retrieval data having that predicate as a keyword is obtained from the retrieval dictionary 213. One or more image objects pointed to by the pointers of the image object retrieval data are obtained. If no predicate is included in the input image retrieval key, step 803 is skipped.

Step 804: One of sets of case element data contained in the input image retrieval key is taken out. Image object retrieval data having the value of the case element of the case element data as a keyword is obtained from the image object retrieval dictionary 213. One or more image objects that are pointed to by the pointers of the image object retrieval data are obtained.

Step 805: It is determined whether or not a retrieval of image objects has been performed for every case element data contained in the input image retrieval key. If the result is "No", the process goes back to step 802. If the result is "Yes", the process proceeds to step 806.

Step 806: One or more image objects commonly included in the image objects obtained based on the predicate and the image objects obtained based on each case element data are selected. The selected one or more image objects are returned as a retrieval result of the IMAGE OBJECT RETRIEVAL ROUTINE.

[IMAGE OBJECT SELECTION ROUTINE]

Figure 9:
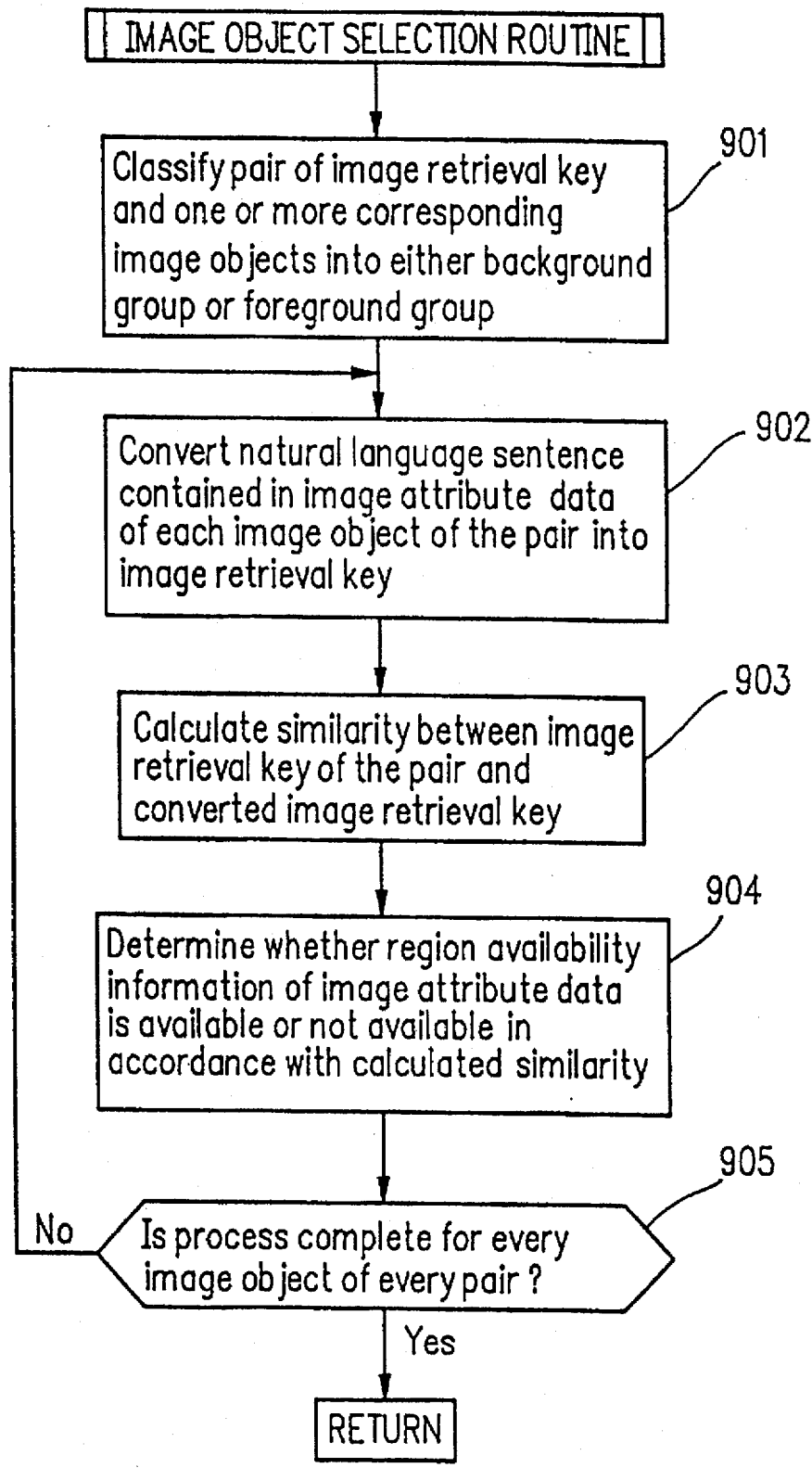
FIG. 9 is a flowchart showing the procedure of an IMAGE OBJECT SELECTION ROUTINE in the image retrieval process according to the present invention.

FIG. 9 shows a process performed in the IMAGE OBJECT SELECTION ROUTINE. The IMAGE OBJECT SELECTION ROUTINE is a routine for subjecting one or more image objects selected through the IMAGE OBJECT RETRIEVAL ROUTINE to a further screening. Hereinafter, this process will be described with respect to each step, with reference to FIG. 9.

Step 901: A pair of an image retrieval key and one or more image objects selected for the image retrieval key through the IMAGE OBJECT RETRIEVAL ROUTINE is input to the IMAGE OBJECT SELECTION ROUTINE. The pair is classified into either a background group or a foreground group depending on the value of the last term (i.e., "background" or "foreground") included in the input image retrieval key.

Step 902: For each of the one or more image objects included in the pair, the information 101 representing the meaning of the whole or part of the pixel data included in the image attribute data of that image object is obtained. As has been described with reference to FIG. 1C, in image attribute data, the information 101 is represented by a natural language sentence. The natural language sentence included in the image attribute data is converted into an image retrieval key by the language processing section 202 and the situation element division section 205. This conversion is achieved by performing the same process as the process for converting a natural language sentence input to the image retrieval apparatus into an image retrieval key.

In order to improve the efficiency of the above conversion, it is preferable to convert into image retrieval keys only those natural language sentences of the image attribute data which are classified into the same group that the pair is classified into. In other words, it is preferable to convert only the natural language sentences which belong to the background group into image retrieval keys if the pair belongs to the background group; and it is preferable to convert only the natural language sentences which belong to the foreground group into image retrieval keys if the pair belongs to the foreground group. Whether a given set of image attribute data belongs to the background or the foreground depends on whether or not region data is described in the region section 102 of the image attribute data.

If some region data is described in the region section 102 of the image attribute data, that image attribute data belongs to the foreground group. If no region data is described in the region section 102 of the image attribute data, that image attribute data belongs to the background group.

Moreover, in order to improve the efficiency of the above conversion, it is preferable, when registering image retrieval data in the image object database 214, to convert the natural language sentence contained in the image retrieval data into an image retrieval key. In this case, the image attribute data of the image objects selected through the IMAGE OBJECT RETRIEVAL ROUTINE have previously converted image retrieval keys. Accordingly, the above conversion process in step 902 can be omitted, thereby enhancing the retrieval speed.

Step 903: Similarity between each of the image retrieval keys obtained from the image attribute data and the input image retrieval key is calculated. This calculation is performed by the image retrieval key similarity calculation algorithm shown below, for example. Other algorithms can be adopted, however.

[Image retrieval key similarity calculation algorithm]

A score indicating the similarity is initialized at zero points before the calculation of the similarity.

One point is added to the score if the predicates of both image retrieval keys coincide with each other.

One point is added to the score if any case element data of the image retrieval keys coincide with each other.

In cases where the number of the case element data contained in each image retrieval key is one, one point is added to the score if only the values of the case elements of the case element data coincide with each other.

In the above algorithm, the similarity can be calculated even more accurately by adding a point equivalent to the correlation (e.g., upper-lower or synonymous correlation) between the predicates and/or case element data of both image retrieval keys even in cases where the predicates and/or case element data of both image retrieval keys do not completely coincide with each other. It can be easily determined whether or not an upper-lower type correlation or synonymous correlation holds by tracing the pointers to other image object retrieval data related to the image object retrieval data, as has been described with reference to FIG. 3.

Step 904: Region availability information of image attribute data corresponding to image retrieval keys that acquired a score higher than a predetermined number of points are made available, and region availability information of other image retrieval keys are made not available.

Step 905: It is determined whether or not the process from step 902 to step 904 is complete for every pair that has been input. If the result is "No", the process goes back to step 902. If the result is "Yes", image objects containing image attribute data are returned as results of the IMAGE OBJECT SELECTION ROUTINE, and this routine is finished.

The display section 215 displays the image objects obtained by the image retrieval section 211 by, if necessary, using region data. The display section 215 also has functions necessary for editing the image objects.

Figure 10:
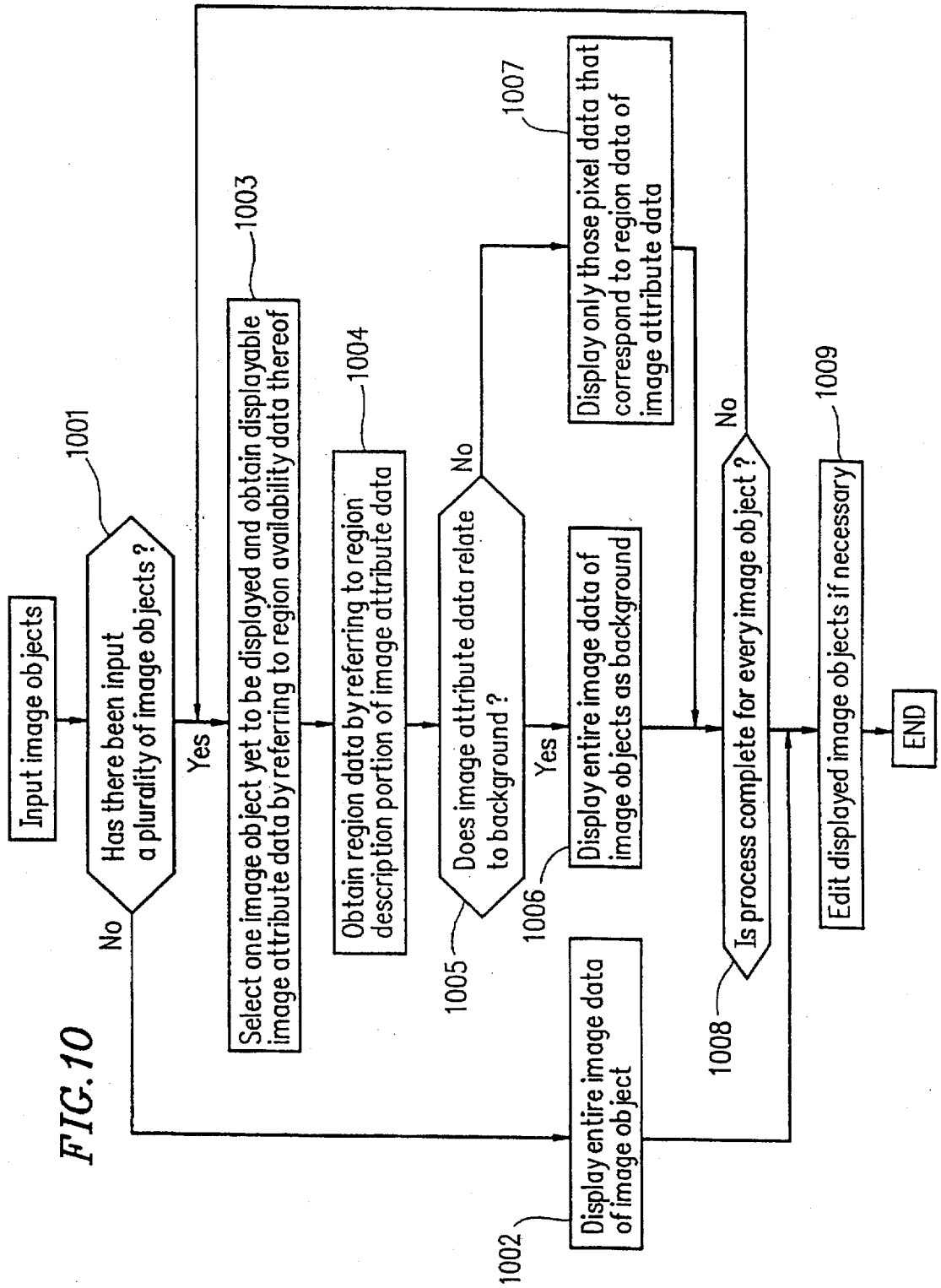
FIG. 10 is a flowchart showing the procedure of a process by a display section.

FIG. 10 shows a process for receiving the image objects obtained by the image retrieval section 211 and displaying necessary portions of the pixel data of those image objects. This process is performed by the display section 215. Hereinafter, this process will be described with respect to each step, with reference to FIG. 10.

Step 1001: Examines whether or not there has been input a plurality of image objects. If the result is "Yes", then each image object is displayed in accordance with the following steps 1003 to 1007. If the result is "No", the process proceeds to step 1002.

Step 1002: The entire pixel data of the input image object is displayed. Thereafter, the process proceeds to step 1009.

Step 1003: One of the plurality of input image objects that has not been displayed is selected. By referring to the region availability information of the image retrieval data of the selected image object, image attribute data that is capable of being displayed is obtained.

Step 1004: Region data is obtained by referring to the region section 102 of the image attribute data.

Step 1005: If no region data is described in the region section 102 of the image attribute data, the image object is judged to be related to the background, and the process proceeds to step 1006. If some region data is described in the region section 102 of the image attribute data, the image object is judged to be related to the foreground, and the process proceeds to step 1007.

Step 1006: The entire pixel data of the image object is displayed as the background.

Step 1007: Only a portion of the pixel data of the image object that corresponds to the region data of the image attribute data is displayed as the foreground.

Step 1008: It is determined whether or not the process is complete for every image object that has been input. If the result is "No", the process goes back to step 1003. If the result is "Yes", the process proceeds to step 1009.

Step 1009: If necessary, the displayed image objects are edited. Thereafter, the process is finished.

Figure 11A:
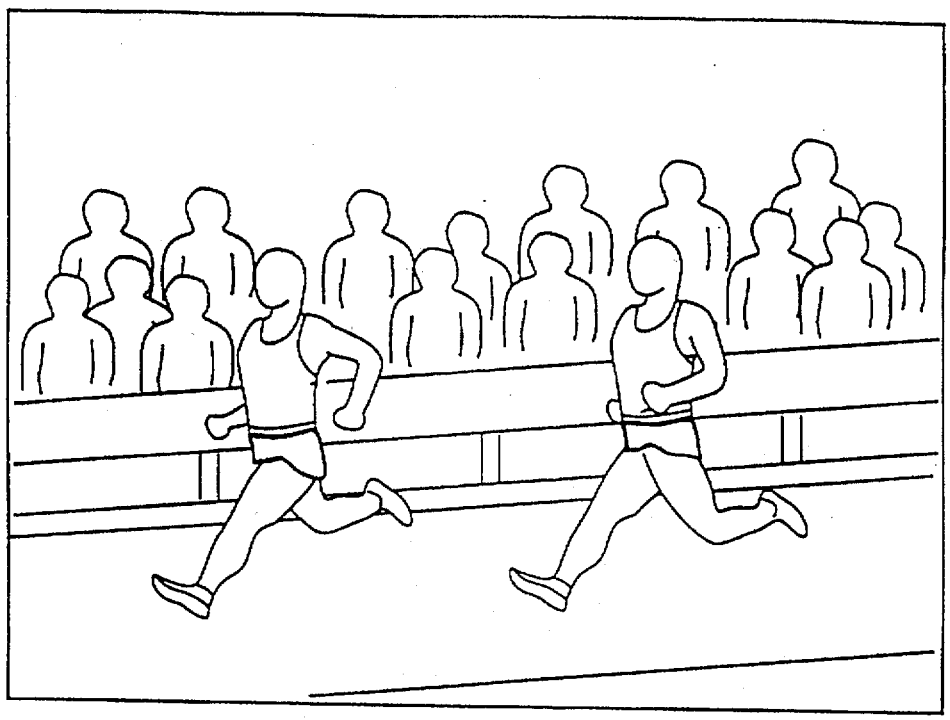
FIG. 11A is a diagram showing an example of an image to be stored in an image database.
Figure 11B:
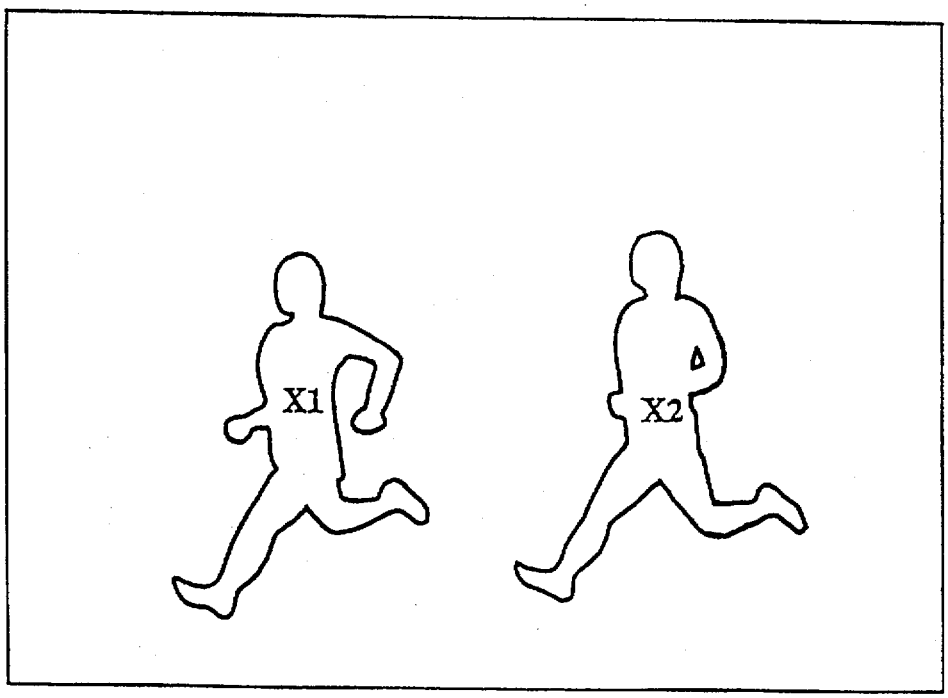
FIG. 11B is a diagram showing examples of regions included in the image shown in FIG. 11A.

Hereinafter, the entire procedure for retrieving image objects by using the image retrieval apparatus according to the present invention will be described in more detail. It is assumed that the above-mentioned natural language sentence (1) is input to the image retrieval apparatus. In addition, the following images 1 and 2 are used as examples of image objects in the description of the retrieval process:

image 1: an image corresponding to FIGS. 1A, 1B, and 1C.

image 2: an image corresponding to FIGS. 11A, 11B, and 11C.

The natural language sentence (1) is input to the image retrieval apparatus by the input section 201. AS the input section 201, a keyboard is typically used. However, it is also applicable to use a tablet or the like instead of a keyboard.

The parsing section 204 parses the input natural language sentence (1). The details of the process by the parsing section 204 have been described earlier and therefore are omitted here. The results of the parsing by the parsing section 204 are expressed in the form of a syntax tree shown in FIG. 4, for example.

The situation element division section 205 converts the syntactic structure of the input natural language sentence (1) into a semantic structure, and divides a situation represented by the semantic structure of the natural language sentence into at least one situation element, so as to generate at least one image retrieval key corresponding to the at least one situation element. The details of the process by the situation element division section 205 have been described earlier and therefore are omitted here. The results of semantic analysis by the situation element division section 205 are expressed in the form of the analysis frame shown in FIG. 6, for example. In accordance with the analysis frame shown in FIG. 6, four image retrieval keys (2-1) to (2-4) are obtained. The image retrieval keys represent the semantic structure of the respective situation elements.

The image retrieval section 211 retrieves image objects from the image database 212 based on the image retrieval keys. The retrieval process includes a process by the IMAGE OBJECT RETRIEVAL ROUTINE and a process by the IMAGE OBJECT SELECTION ROUTINE. The IMAGE OBJECT RETRIEVAL ROUTINE obtains image objects related to the natural language sentence (1) from the image database 212 by using the image retrieval keys (2-1) to (2-4). The IMAGE OBJECT SELECTION ROUTINE subjects the image objects retrieved based on the image retrieval keys and the image attribute data of the image objects obtained through the IMAGE OBJECT RETRIEVAL ROUTINE to a further screening.

First, the process by the IMAGE OBJECT RETRIEVAL ROUTINE will be described with respect to a case where the above-mentioned image retrieval key (2-1) is input to the IMAGE OBJECT RETRIEVAL ROUTINE.

Since the image retrieval key (2-1) contains the predicate "run", image object retrieval data including the predicate "run" as a keyword are obtained from the image object retrieval dictionary 213 shown in FIG. 3 in accordance with step 803 shown in FIG. 8. The image object retrieval data includes "Image 1" and "Image 2" as pointers to the related image objects, as shown in FIG. 3. In the remaining portion of the present specification, it is assumed, for conciseness, that the only image objects that can be selected by the IMAGE OBJECT RETRIEVAL ROUTINE are the specific image objects shown in FIG. 3. Accordingly, image 1 and image 2 are obtained by tracing the above pointers.

Since the image retrieval key (2-1) includes the case element data "Agent (Tom)", image object retrieval data including the case element data value "Tom" as a keyword is obtained from the image object retrieval dictionary 213 shown in FIG. 3, in accordance with step 804 shown in FIG. 8. The image object retrieval data includes "Image 2" and "Image 9" as pointers to the related image objects, as shown in FIG. 3. Accordingly, image 2 and image 9 are obtained by tracing these pointers.

Next, image objects commonly included in the image objects obtained based on the predicate "run" (i.e., image 1 and image 2) and the image objects obtained based on the case element data "AGENT (Tom)" (i.e., image 2 and image 9) are selected. As a result, image 2 is selected as the common image object. This selection result is output as a result of the IMAGE OBJECT RETRIEVAL ROUTINE.

Similarly, the image retrieval keys (2-2) to (2-4) are consecutively input to the IMAGE OBJECT RETRIEVAL ROUTINE. As a result, the following image objects are selected, in accordance with the input image retrieval key, through the IMAGE OBJECT RETRIEVAL ROUTINE:

image retrieval key (2-1): "Image 2"
image retrieval key (2-2): "Image 1" and "Image 2"
image retrieval key (2-3): "Image 2" and "Image 10"
image retrieval key (2-4): "Image 2" and "Image 12"

Next, the process by the IMAGE OBJECT RETRIEVAL ROUTINE will be described.

As described above, image 2 has been selected for the image retrieval key (2-1), so That a pair consisting of the image retrieval key (2-1) and the image object "Image 2" is input to the IMAGE OBJECT RETRIEVAL ROUTINE. The last term of the image retrieval key (2-1) is "foreground". Therefore, the pair of the image retrieval key (2-1) and the image object "Image 2" is classified into the foreground group, in accordance with step 901 shown in FIG. 9. Similarly, the respective pairs of image retrieval keys and image objects are classified into either the foreground group or the background group as follows:

Foreground group:
the pair of the image retrieval key (2-1) and the image object "Image 2": (3-1) the pair of the image retrieval key (2-2) and the image objects "Image 1" and "Image 2": (3-2)

Background group:
the pair of the image retrieval key (2-3) and the image objects "Image 2" and "Image 10": (3-3)
the pair of the image retrieval key (2-4) and the image objects "Image 2" and "Image 12": (3-4)

The pair (3-1) of the image retrieval key (2-1) and the image object "Image 2" belongs to the foreground. The image object "Image 2" has image attribute data of the structure shown in FIG. 11C. Among the image attribute data of the image object "Image 2", only the three natural language sentences ("John is running", "Tom is running", and "Tom is running a race with John") of the image attribute data corresponding to the foreground are converted into image retrieval keys, in accordance with step 902 shown in FIG. 9. As a result, the three following image retrieval keys are obtained:

((run, AGENT (John)), "foreground"):(4-1)
((run, PARTICIPANT (Tom)), "foreground"):(4-2)
(run a race, AGENT (Tom), PARTICIPANT (John), "foreground"):(4-3)

The similarity between the image retrieval key (2-1) and each of the three image retrieval keys (4-1) to (4-3) is calculated in accordance with step 903 shown in FIG. 9. The following results are obtained by calculating the respective similarities in accordance with the image retrieval key similarity calculation algorithm:

Similarity between the image retrieval key (2-1) and the image retrieval key (4-1):
1 point because the predicates of the image retrieval keys coincide with each other.

Similarity between the image retrieval key (2-1) and the image retrieval key (4-2):
2 points because the predicates of the image retrieval keys coincide with each other; the number of the case element data of either image retrieval key is one; and the values of the case element data of the image retrieval keys coincide with each other.

Similarity between the image retrieval key (2-1) and the image retrieval key (4-3):
0 points.

Now, it is assumed that the region availability information of the image attribute data corresponding to the image retrieval keys which scored points other than zero is made available. In this case, the region availability information of the image attribute data corresponding to the image retrieval key (4-1) (i.e., the image attribute data in the first line of FIG. 11C) and the region availability information of the image attribute data corresponding to the image retrieval key (4-2) (i.e., the image attribute data in the second line of FIG. 11C) are made available in accordance with step 904 shown in FIG. 9.

The process from steps 902 to 904 in FIG. 9 is also performed for the pairs (3-2), (3-3), and (3-4). The image object "Image 2" is included in all of the pairs (3-1) to (3-4). The following results are obtained by sorting out the image attribute data whose region availability information is available, among all the image attribute data of the image object "Image 2", in descending order of scores indicating similarities (where the first term in each parenthesis indicates the line number of the corresponding image attribute data shown in FIG. 11C, and the second term in each parenthesis indicates the points of the score indicating similarities):

Foreground group:
image retrieval key (2-1): (2,2), (1,1)
image retrieval key (2-2): (1,2), (2,1)
Background group:
image retrieval key (2-3): (4,1)
image retrieval key (2-4): (4,1)

Similarly, the similarities are calculated for the image objects, other than "Image 2", included in each pair. Herein, it is assumed that the similarities of the image objects, other than "Image 2", included in each pair are zero for conciseness.

Among the image objects classified into the background group, those which are included in the most pairs are selected in accordance with step 703 shown in FIG. 7. In this exemplary case, the image object "Image 2" is the one that is included in the most pairs among those classified into the background group because the image object "Image 2" is included in both pairs (3-3) and (3-4) classified into the background group. Accordingly, the image object "Image 2" is selected in step 703 shown in FIG. 7.

Among the image objects classified into the foreground group, those which are included in the most pairs are selected in accordance with step 704 shown in FIG. 7. In this exemplary case, the image object "Image 2" is the one that is included in the most pairs among those classified into the foreground group because the image object "Image 2" is included in both pairs (3-1) and (3-2) classified into the foreground group. Accordingly, the image object "Image 2" is selected in step 704 shown in FIG. 7.

The image object "Image 2" is output as an image object corresponding to the background, and the image object "Image 2" is also output as an image object corresponding to the foreground in accordance with step 705 shown in FIG. 7. These outputs are the retrieval results, for the image retrieval keys (2-1) to (2-4), of the image retrieval section 211.

The display section 215 displays the image objects that have been retrieved by the image retrieval section 211. In this exemplary case, the image object "Image 2" is the only image object that has been retrieved by the image retrieval section 211. Accordingly, the entire pixel data of the image object "Image 2" (i.e., the pixel data of FIG. 11A) is displayed by the display section 215 in accordance with steps 1001 and 1002 shown in FIG. 10.

The above-described image retrieval process corresponds to a case where an image object that completely coincides with the content of the input natural language sentence is found. However, in accordance with the image retrieval process of the present invention, it is possible to retrieve a plurality of image objects that are necessary for expressing the content of the input natural language sentence even in cases where no image object that completely coincides with the content of the input natural language sentence is found. For example, a case will be described where image objects are retrieved from the image database 212 based on the following natural language sentence (5):

"John is running with Tom at ○○ Park": (5)

The natural language sentence (5) is input to the image retrieval apparatus by the input section 201. An analysis frame shown in FIG. 12 representing the semantic structure of the input natural language sentence (5) is obtained by means of the parsing section 204 and the situation element division section 205. Next, the situation element division section 205 divides a situation represented by the analysis frame (FIG. 12) into three situation elements, so as to generate the following image retrieval keys corresponding to the three situation elements:

((run, AGENT (John)), "foreground"): (6-1)

((run, PARTICIPANT (Tom)), "foreground"): (6-2)

(LOCATIVE (○○ Park), "background"): (6-3)

The image retrieval section 211 performs an image retrieval process through the IMAGE OBJECT RETRIEVAL ROUTINE and a process by the IMAGE OBJECT SELECTION ROUTINE. In the IMAGE OBJECT RETRIEVAL ROUTINE, image objects related to the input natural language sentence (5) are obtained from the image database 212 based on the image retrieval keys (6-1) to (6-3). In the IMAGE OBJECT SELECTION ROUTINE, pairs of image retrieval keys and image objects are classified into either the background group or the foreground group. The results will be as follows, for example:

Foreground group:
 the pair of the image retrieval key (6-1) and the image objects "Image 1" and "image 2":(7-1)
 the pair of the image retrieval key (6-2) and the image objects "Image 2" and "Image 9":(7-2)

Background group:
 the pair of the image retrieval key (6-3) and the image objects "Image 1" and "Image 6":(7-3)

With respect to the image object "Image 1", it is assumed that, as a result of the above-mentioned similarity calculation, the value of the region availability information of the image attribute data 103 shown in the first line of FIG. 1C, which corresponds to the image retrieval key (6-1) is made available, and that the value of the region availability information of the image attribute data 107 shown in the eighth line of FIG. 1C, which corresponds to the image retrieval key (6-3) is made available. With respect to the image object "Image 2", it is assumed that the value of the region availability information of the image attribute data shown in the second line of FIG. 11C, which corresponds to the image retrieval key (6-2) is made available. It is assumed that the values of region availability information of the other image retrieval data are made not available.

The image objects "Image 1" and "Image 6" are selected as image objects corresponding to the background in accordance with step 703 shown in FIG. 7, and the image object "Image 2" is selected as an image object corresponding to the foreground in accordance with step 704 shown in FIG. 7. The image objects "Image 1" and "Image 6" are output as image objects corresponding to the background, and the image object "Image 2" is also output as an image object corresponding to the foreground in accordance with step 705 shown in FIG. 7. These outputs are the retrieval results, for the image retrieval keys (6-1) to (6-4), of the image retrieval section 211.

In this exemplary case, the image objects "Image 1", "Image 6", and "Image 2" are the image objects that have been retrieved by the image retrieval section 211. Accordingly, the entire pixel data of the image object "Image 1" (i.e., the pixel data of FIG. 1A) is displayed by the display section 215 in accordance with steps 1005 and 1006 shown in FIG. 10. Moreover, the pixel data of region $X_2$ corresponding to the image attribute data of the second line of FIG. 11C of the image object "Image 2" (i.e., the pixel data of region $X_2$ of FIG. 11B) is displayed by the display section 215 in accordance with steps 1005 and 1007 shown in FIG. 10. Since the region availability information of the image attribute data contained in the image object "Image 6" is all not available, the inputting of the image object "Image 6" to the display section 215 may be omitted.

The image objects displayed by the display section 215 are edited if necessary. A combination of the pixel data and further pixel data is a typical example of such editing.

Figure 13:
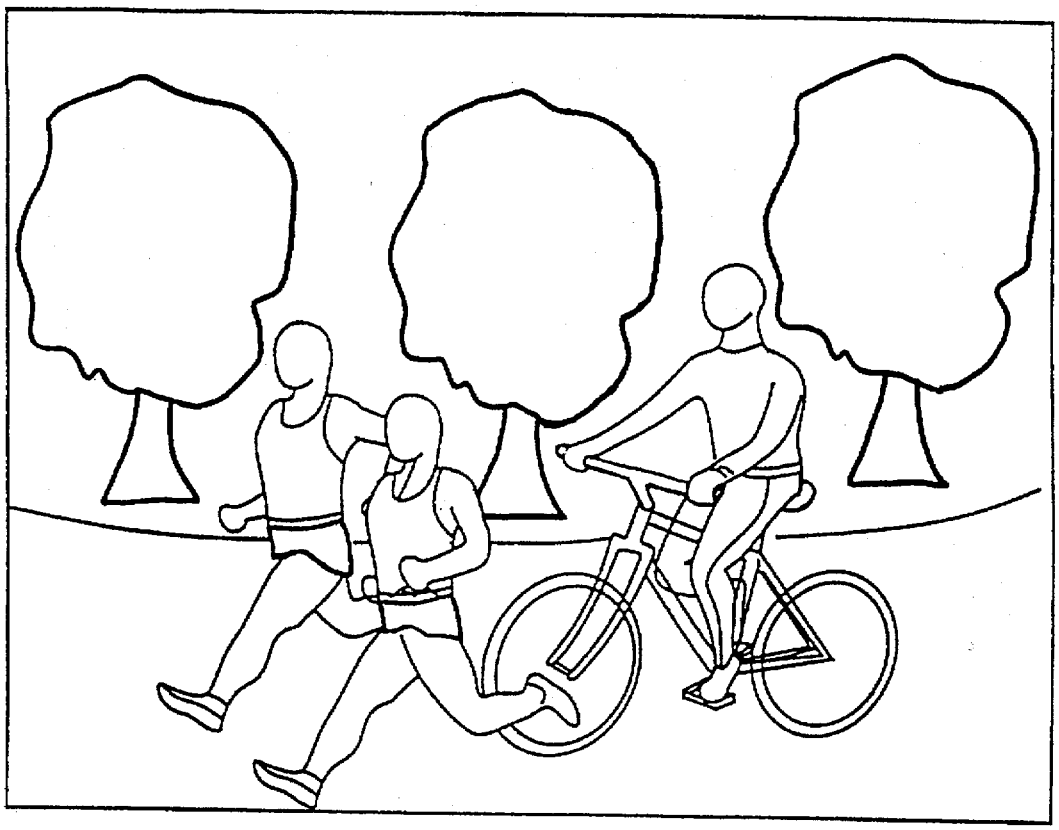
FIG. 13 is a diagram showing a result of the edition of retrieved image objects.

FIG. 13 shows an example of a combination result of pixel data of FIG. 1A and the pixel data of region $X_2$ of FIG. 11B.

The image retrieval apparatus according to the present invention utilizes a natural language as an inquiry language for an image database, as opposed to the conventional retrieval methods using keywords. This makes it possible to accurately convey the meaning of a desired image to the image retrieval apparatus. The present invention has a particular significance in that, even if a user does not know the content of the desired image, the user can still retrieve the image from the image database.

Moreover, according to the present invention, each image object has a semantic structure representing the whole or part of an image. The meaning of the entire image corresponds to a situation represented by the entire image. The meaning of a part of the image (i.e. a region included in the image) corresponds to a situation element(s) constituting the situation. In the image retrieval process according to the present invention, the syntactic structure of an input natural language sentence is converted into a semantic structure. The situation represented by the semantic structure of the natural language sentence is divided into at least one situation element, and an image retrieval key corresponding to the at least one situation element is defined. By referring to the respective situation elements corresponding to image objects based on the image retrieval key, image objects having meanings most similar to the meanings of the image retrieval keys are retrieved from the image object database. Accordingly, image objects can be retrieved for every situation element representing partial meanings of the input natural language sentence even in cases where no image object that completely coincides with the meaning of the input natural language sentence is present in the image object database. This facilitates displaying of combined image objects and editing such image objects. As a result, the user can easily obtain the desired image.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for retrieving image objects in accordance with a natural language sentence, comprising:

an image database for storing a plurality of image objects, each of the plurality of the image objects comprising image attribute data selectively representative of a meaning of a single region and a combination of a plurality of regions making up a portion of an image;

input means for receiving a natural language sentence;

a knowledge base for defining a semantic structure of the natural language sentence;

extracting means for extracting at least one predicate and at least one case element from the natural language sentence;

judging means for judging whether the extracted predicate and the extracted case element are correlated with each other by referring to the knowledge base;

correlating means for correlating the extracted predicate and the extracted case element with each other in accordance with the judging result, so as to define an image retrieval key representing a partial meaning of the natural language sentence; and retrieval means for retrieving at least one image object from the plurality of image objects stored in the image database based on a semantic similarity between the image retrieval key and the image attribute data, the retrieval means being selectively operative based on the semantic similarity to retrieve image objects representative of only portions of images.

2. An apparatus according to claim 1, wherein the image attribute data includes region data defining one of a single region and a combination of a plurality of regions included in the image and information representing the meaning of one of the single region and the combination of the plurality of regions.

3. An apparatus according to claim 2, wherein the information is represented by the natural language sentence.

4. An apparatus according to claim 1, wherein the retrieval means comprises means for providing region availability information defining whether the image attribute data is available or not available in accordance with the semantic similarity between the image retrieval key and the image attribute data.

5. An apparatus according to claim 4, wherein the apparatus further comprises display means for displaying at least a portion of the image object retrieved by the retrieval means in accordance with the region availability information.

6. An apparatus according to claim 1, wherein the knowledge base comprises a plurality of case frames for defining a meaning of the natural language sentence, and wherein each of the plurality of the case frames comprises:

a word defining a predicate in the natural language sentence;

a slot describing a name of a case element related to the word and a constraint for the case element to satisfy; and situation element data describing knowledge for correlating a predicate with at least one case element.

7. An apparatus according to claim 1, wherein the correlating means classifies the image retrieval key into a group related to a background and a group related to a foreground based on the situation element division data of the case frames.

8. An apparatus for retrieving image objects in accordance with a natural language sentence, comprising:

an image database for storing a plurality of image objects, each of the plurality of image objects comprising image attribute data selectively representative of a meaning of a single region and a combination of a plurality of regions making up a portion of an image;

input means for receiving a natural language sentence;

parsing means for parsing the natural language sentence so as to obtain an analysis frame representing a meaning of the natural language sentence, the analysis frame including at least one element;

correlating means for correlating the at least one element of the analysis frame with one another so as to define an image retrieval key representing a partial meaning of the natural language sentence; and retrieval means for retrieving at least one image object from the plurality of image objects stored in the image database based on a semantic similarity between the image retrieval key and the image attribute data, the retrieval means being selectively operative based on the semantic similarity to retrieve image objects representative of only portions of images.

9. An apparatus according to claim 8, wherein the analysis frame includes a predicate, a case element related to the predicate, and a value of the case element.

10. An apparatus according to claim 8, wherein the correlating means defines either an image retrieval key related to a background or an image retrieval key related to a foreground in accordance with the partial meaning of the natural language sentence.

11. A method for retrieving image objects from an image database in accordance with a natural language sentence, the image database storing a plurality of image objects, each of the plurality of image objects including image attribute data selectively representative of a meaning of a single region and a combination of a plurality of regions making up a portion of an image, wherein the method comprises the steps of:

a) receiving a natural language sentence;

b) parsing the natural language sentence so as to obtain an analysis frame representing a meaning of the natural language sentence, the analysis frame including at least one element;

c) correlating the at least one element of the analysis frame with one another so as to define an image retrieval key representing a partial meaning of the natural language sentence; and d) retrieving at least one image object from the plurality of image objects stored in the image database based on a semantic similarity between the image retrieval key and the image attribute data, such retrieving being selectively operative based on the semantic similarity to retrieve image objects representative of only portions of images.

12. A method according to claim 11, wherein the analysis frame includes a predicate, a case element related to the predicate, and a value of the case element.

13. A method according to claim 11, wherein the step c) comprises a step for defining either an image retrieval key related to a background or an image retrieval key related to a foreground in accordance with the partial meaning of the natural language sentence.

\* \* \* \* \*